(12) United States Patent
Ruiz et al.

(10) Patent No.: US 7,305,825 B2
(45) Date of Patent: Dec. 11, 2007

(54) ENGINE TURBINE TEMPERATURE CONTROL SYSTEM

(75) Inventors: Victoriano Ruiz, Brighton, MI (US); Douglas J. Babcock, Dexter, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/965,416

(22) Filed: Oct. 14, 2004

(65) Prior Publication Data

US 2006/0080959 A1    Apr. 20, 2006

(51) Int. Cl.
*F02D 23/00* (2006.01)
*F02B 33/44* (2006.01)
*F01N 3/00* (2006.01)

(52) U.S. Cl. .................. 60/602; 60/605.1; 60/276; 60/285; 60/298; 60/284; 60/274

(58) Field of Classification Search ............... 60/603, 60/601, 602, 611, 605.1, 298, 285, 276, 277, 60/274, 284; 123/559.1, 564
See application file for complete search history.

(56) References Cited

U.S. PATENT DOCUMENTS

| | | | | |
|---|---|---|---|---|
| 4,400,944 A | * | 8/1983 | Iwamoto et al. | 60/605.1 |
| 4,433,654 A | * | 2/1984 | Yokooku | 60/605.1 |
| 4,450,814 A | * | 5/1984 | Sawamoto et al. | 60/605.1 |
| 4,509,331 A | * | 4/1985 | Hirabayashi | 60/602 |
| 4,612,770 A | * | 9/1986 | Tadokoro et al. | 60/280 |
| 4,674,283 A | * | 6/1987 | Ishida et al. | 60/276 |
| 5,211,010 A | * | 5/1993 | Hirota | 60/280 |
| 5,278,762 A | * | 1/1994 | Kawamura | 123/676 |
| 5,303,168 A | * | 4/1994 | Cullen et al. | 123/568.21 |
| 5,526,645 A | * | 6/1996 | Kaiser | 123/564 |
| 6,314,735 B1 | * | 11/2001 | Kolmanovsky et al. | 60/602 |
| 6,382,177 B1 | * | 5/2002 | Saito | 123/299 |
| 6,390,081 B1 | * | 5/2002 | Novak et al. | 123/676 |
| 6,397,820 B1 | * | 6/2002 | Novak et al. | 123/676 |
| 6,609,372 B2 | * | 8/2003 | Maddock et al. | 60/603 |
| 6,684,630 B2 | * | 2/2004 | Uchida et al. | 60/285 |
| 6,687,601 B2 | * | 2/2004 | Bale et al. | 60/602 |
| 6,748,919 B2 | * | 6/2004 | Abo et al. | 123/299 |
| 6,840,235 B2 | * | 1/2005 | Koseki et al. | 123/568.14 |
| 6,935,104 B2 | * | 8/2005 | Kawatani et al. | 60/286 |

* cited by examiner

*Primary Examiner*—Thai-Ba Trieu

(57) ABSTRACT

A turbine temperature control (TTC) system for regulating operation of an engine to control a temperature of a forced air induction device. The system includes a sensor that is responsive to an exhaust gas temperature and that generates a signal. A control module determines a temperature based on the temperature signal and compares the temperature to a threshold temperature. The control module regulates operation of the engine to decrease the temperature when the temperature exceeds the threshold temperature.

11 Claims, 3 Drawing Sheets

ENGINE TURBINE TEMPERATURE CONTROL SYSTEM

FIELD OF THE INVENTION

This invention relates to engines equipped with a forced induction system, and more particularly to controlling engine operation to prevent damage to components of the forced induction system.

BACKGROUND OF THE INVENTION

A forced induction system such as a turbocharger or supercharger can boost an engine's horsepower without significantly adding weight. By increasing the charge air density in the individual cylinders, additional fuel can be added and a higher combustion pressure is achieved. Often, engines equipped with fuel injection systems utilize feedback from oxygen sensors in the exhaust to determine the appropriate air-to-fuel ratio. As such, when an engine is configured with a turbocharger, the fuel injection system increases the fuel flow to the cylinder relative to the increased air flow from the turbocharger.

The turbocharger converts exhaust flow energy to mechanical energy via a turbine. The turbine drives an intake air compressor via a shaft. The turbine is positioned in the exhaust stream and is driven by the exhaust stream. The intake air compressor compresses air and provides the pressurized air to the engine. Because the turbine is directly driven by the exhaust gas, exhaust gas temperature affects turbine component durability. The turbine can fail when the exhaust temperature is higher than the operating limit for the turbocharger components.

SUMMARY OF THE INVENTION

Accordingly, the present invention provides a turbine temperature control (TTC) system for regulating operation of an engine to control a temperature of a forced air induction device. The system includes a sensor that is responsive to an exhaust gas temperature and that generates a signal. A control module determines a temperature based on the temperature signal and compares the temperature to a threshold temperature. The control module regulates operation of the engine to decrease the temperature when the temperature exceeds the threshold temperature.

In one feature, the control module regulates at least one of an air-to-fuel ratio and a spark timing to decrease the temperature.

In another feature, the threshold temperature is determined based on a safe operating temperature of the forced air induction device.

In another feature, the system further includes a fuel injection system. The control module controls the fuel injection system to adjust an air-to-fuel ratio to decrease the temperature.

In another feature, the system further includes a spark control system. The control module controls the spark control system to adjust a spark timing to decrease the temperature.

In another feature, the control module operates the forced air induction device to reduce a charge pressure when the temperature exceeds the threshold temperature.

In still other features, the control module regulates operation of the engine to increase the temperature when the temperature is below the threshold temperature. The system further includes a fuel injection system. The control module controls the fuel injection system to adjust an air-to-fuel ratio to increase the temperature. The system further includes a spark control system. The control module controls the spark control system to adjust a spark timing to increase the temperature. The control module operates the forced air induction device to induce a charge pressure when the temperature is below the threshold temperature.

In yet another feature, the sensor is an oxygen sensor.

Further aspects and features will become apparent from the detailed description provided hereinafter. It should be understood that the detailed description and specific examples, while indicating one or more preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE INVENTION

Figure 1:
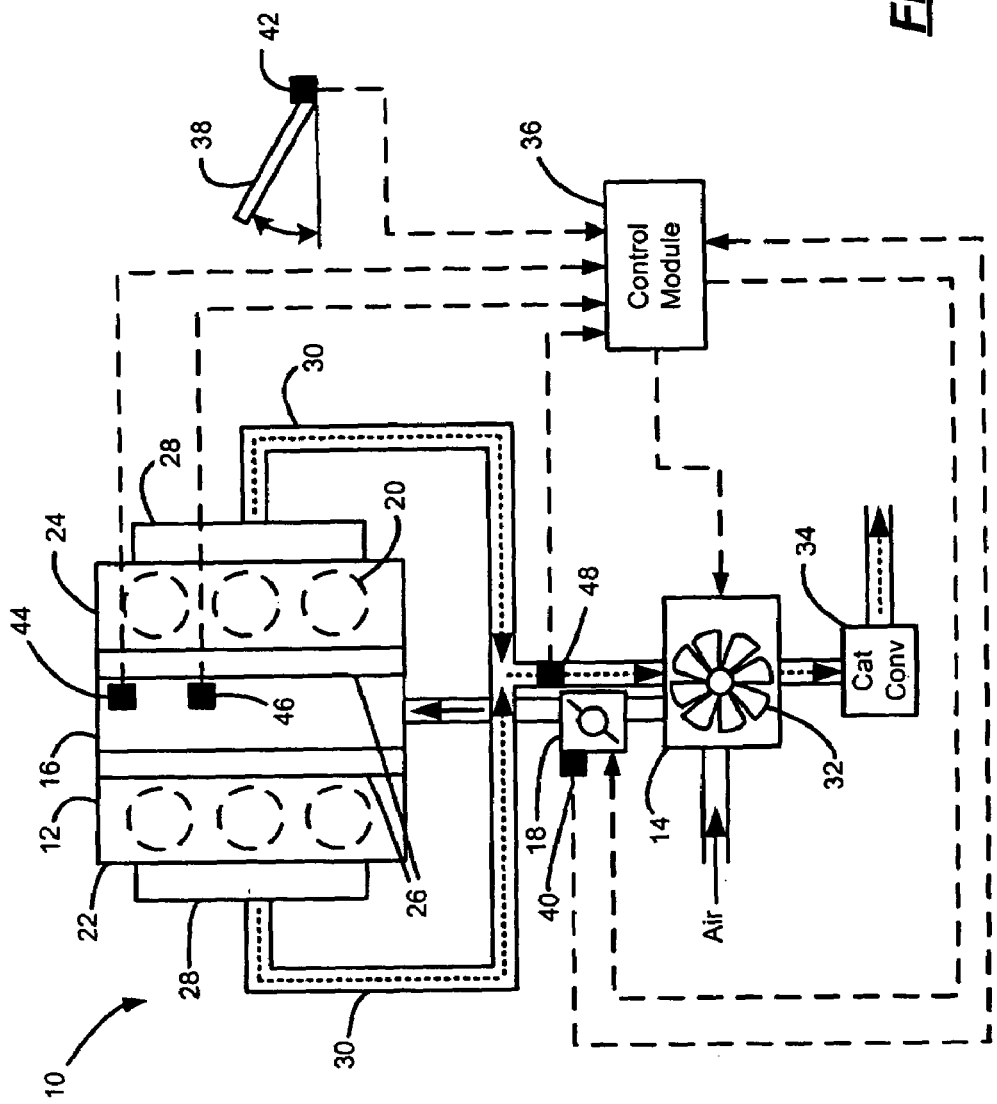
FIG. 1 is a functional block diagram of an exemplary engine system including a turbocharger according to the present invention.

The following description of the embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary engine system 10 includes an engine 12 that combusts an air and fuel mixture to produce drive torque. Air is drawn into and is compressed within a forced induction unit or turbo 14. The pressurized or charged air flows into an intake manifold 16 through a throttle 18. The throttle 18 regulates mass air flow into the intake manifold 16. Air within the intake manifold 16 is distributed into cylinders 20 grouped in cylinder banks 22, 24. Although six cylinders 20 are illustrated in a V-type configuration it is appreciated that the turbo temperature control system of the present invention can be implemented in engines having 2, 3, 4, 5, 8, 10 and 12 cylinders in various configurations including, but not limited to, in-line and W-type configurations.

A fuel supply system 26 distributes fuel to each cylinder 20 via a fuel injector (not shown). It is anticipated that the engine system 10 can process one of various types of fuels known in the art to produce drive torque. Such fuels include, but are not limited to, gasoline, natural gas and hydrogen. An air/fuel mixture is supplied to each cylinder 20 through an intake port (not shown) that is selectively opened by an intake valve (not shown). The air-to-fuel (A/F) ratio is controlled to achieve a desired A/F ratio. The A/F ratio can be adjusted by the fuel supply system to regulate the volume of fuel supplied to each cylinder 20 relative to the volume of air. The air/fuel mixture is compressed by a piston (not shown) and combustion is initiated by the heat of compression and/or a spark generated by a spark plug. The combustion process drives the piston within the cylinder 20, which in turn rotatably drives a crankshaft (not shown). Combustion exhaust is exhausted from the cylinder 20 through an exhaust port (not shown) that is selectively opened by an exhaust valve (not shown). The exhaust from the collective cylinders 20 of the cylinder banks is directed by respective exhaust manifolds 28 and is exhausted from the engine 12 through exhaust conduits 30.

The turbo 14 is driven by the collective exhaust. More particularly, the exhaust drives a turbine (not shown), which drives an intake air compressor (IAC) 32. The IAC 32 compresses the incoming air and provides the charged air to the intake manifold 16 for distribution into the cylinders 20. Post-turbine exhaust is treated in a catalytic converter 34 and is exhausted to atmosphere. It is anticipated that the turbo 14 can be one of several exhaust driven turbos known in the art including, but not limited to, a waste-gate type turbo.

A control module 36 operates the engine 12 based on operator input via an accelerator pedal 38 and the turbo temperature control of the present invention. The control module 36 can control the entire engine system 10 or can include sub-modules that control different aspects of the engine system 10 including, but not limited to, an engine control module (ECM), a fuel injection sub-module, a turbo control sub-module and a dynamic spark control (DSC) sub-module. The control module 36 or sub-modules generate control signals to regulate engine components in response to engine operating conditions and the turbo temperature control (TTC) system of the present invention.

The control module 36 controls the engine system 10 based on signals generated by various sensor. A throttle position sensor (TPS) 40 is responsive to a position of a throttle plate and generates a throttle position signal. An accelerator pedal position sensor 42 generates a position signal indicating the position of the accelerator pedal 38. The control module regulates the position of the throttle plate and operation of the turbo 14 based on the accelerator pedal position. A manifold absolute pressure (MAP) sensor 44 is responsive to air pressure within the intake manifold 16 and generates a MAP signal. An engine speed sensor 46 generates an engine speed signal.

An oxygen sensor 48 that is responsive to an oxygen content of the exhaust can be included in the exhaust conduit 26. The oxygen sensor 48 generates an oxygen content signal. The oxygen sensor 48 includes a heating element that is responsive to the heat of the exhaust gas. As a result, the oxygen sensor 48 can be configured to be generate an exhaust gas temperature ($T_{EXH}$) signal, as well as the oxygen content signal. It is anticipated that $T_{EXH}$ can be determined based on the exhaust temperature signal generated by a separate exhaust temperature sensor (not shown). It is further anticipated that $T_{EXH}$ can be estimated or determined from a model or algorithm based on one or more sensed engine operating characteristics or parameters.

The control module 36 controls engine operation to maintain $T_{EXH}$ at or near a temperature limit ($T_{LIMIT}$) under a closed loop control. More specifically, because the exhaust directly drives the turbo 14, $T_{EXH}$ is indicative of the temperature the turbo components are experiencing at a given moment. The turbo components may fail if they operate for extended periods of time at temperatures greater than a threshold temperature ($T_{THRESH}$) (e.g., 950° C.). Such extreme temperatures are commonly achieved by the exhaust. Therefore, $T_{LIMIT}$ is set at a level below $T_{THRESH}$ (e.g., 900° C.). If $T_{EXH}$ exceeds $T_{LIMIT}$ the control module 36 regulates engine operation to reduce $T_{EXH}$. If $T_{EXH}$ is below $T_{LIMIT}$, the control module 36 regulates engine operation to increase $T_{EXH}$. The control module 36 sets a turbine temperature control (TTC) flag to ACTIVE while the TTC system is operating.

The control module 36 can regulate engine operation in various manners to affect $T_{EXH}$. For example, the A/F ratio can be adjusted (i.e., enriched or enleaned) to reduce or increase $T_{EXH}$. Whether the A/F ratio is enriched (i.e., adding fuel) or enleaned (i.e., reducing fuel) to affect $T_{EXH}$ is based on the type of fuel that is processed by the engine system 10. For example, a reduction in $T_{EXH}$ is traditionally achieved by enriching the A/F ratio in gasoline driven engines. However, a reduction in $T_{EXH}$ can be achieved by enleaning the A/F ratio in natural gas driven engines. In certain circumstances, however, it is appreciated that enleaning the A/F ratio in gasoline driven engines can also reduce $T_{EXH}$ and enriching the A/F ratio in natural gas driven engines can also reduce $T_{EXH}$. It should be noted that the degree to which the A/F ratio can be adjusted is limited. That is to say, the A/F ratio has a maximum authority to which it can be adjusted. The A/F ratio adjustment is limited to its maximum authority to maintain stable engine operation.

Additionally, the spark timing can be adjusted (i.e., advanced or retarded) to reduce or increase $T_{EXH}$. The spark timing is defined as the timing of the ignition spark relative to piston position (e.g., top dead center (TDC)) within the cylinder 20, which is determined by the rotational position of the crankshaft. Similar to the A/F ratio adjustment, the degree to which the spark timing can be adjusted is limited. That is to say, the spark timing has a maximum authority to which it can be adjusted. The spark timing adjustment is limited to its maximum authority to ensure stable engine operation.

It is also anticipated that operation of the turbo 14 can be regulated to reduce the effect of the exhaust gas on the turbo components. For example, the turbo 14 can be regulated to provide a lower charge pressure ($P_{CHARGE}$) of the charge air provided to the intake manifold 16. This effectively decreases the amount of work required to drive the turbo 14. In the case of a waste-gate type turbo, $P_{CHARGE}$ is adjusted by regulating a waste-gate valve (not shown), which enables a portion of the intake air to bypass the turbo 14.

Figure 2A:
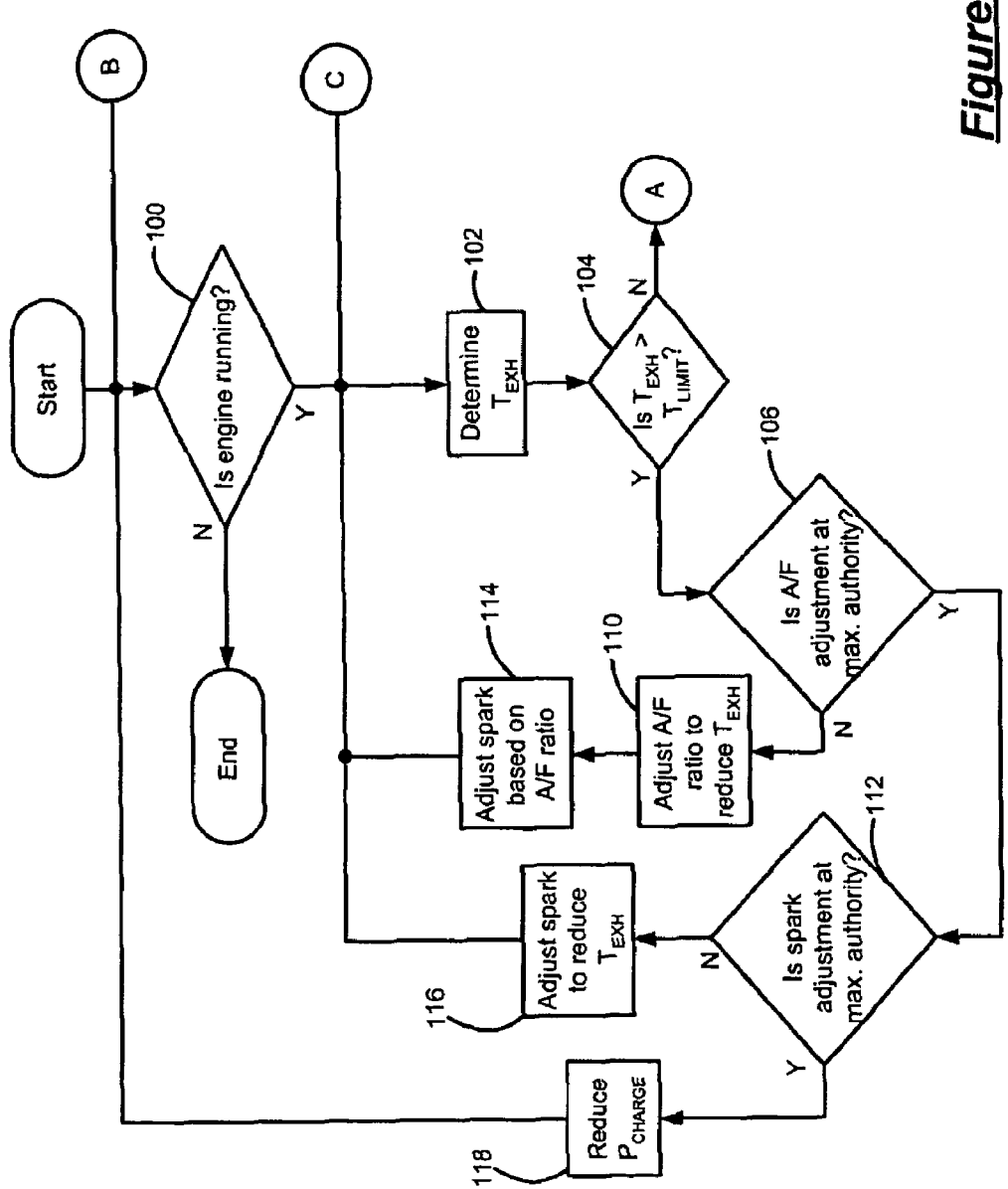
FIG. 2A is flow chart illustrating steps performed by the engine control system of the present invention.
Figure 2B:
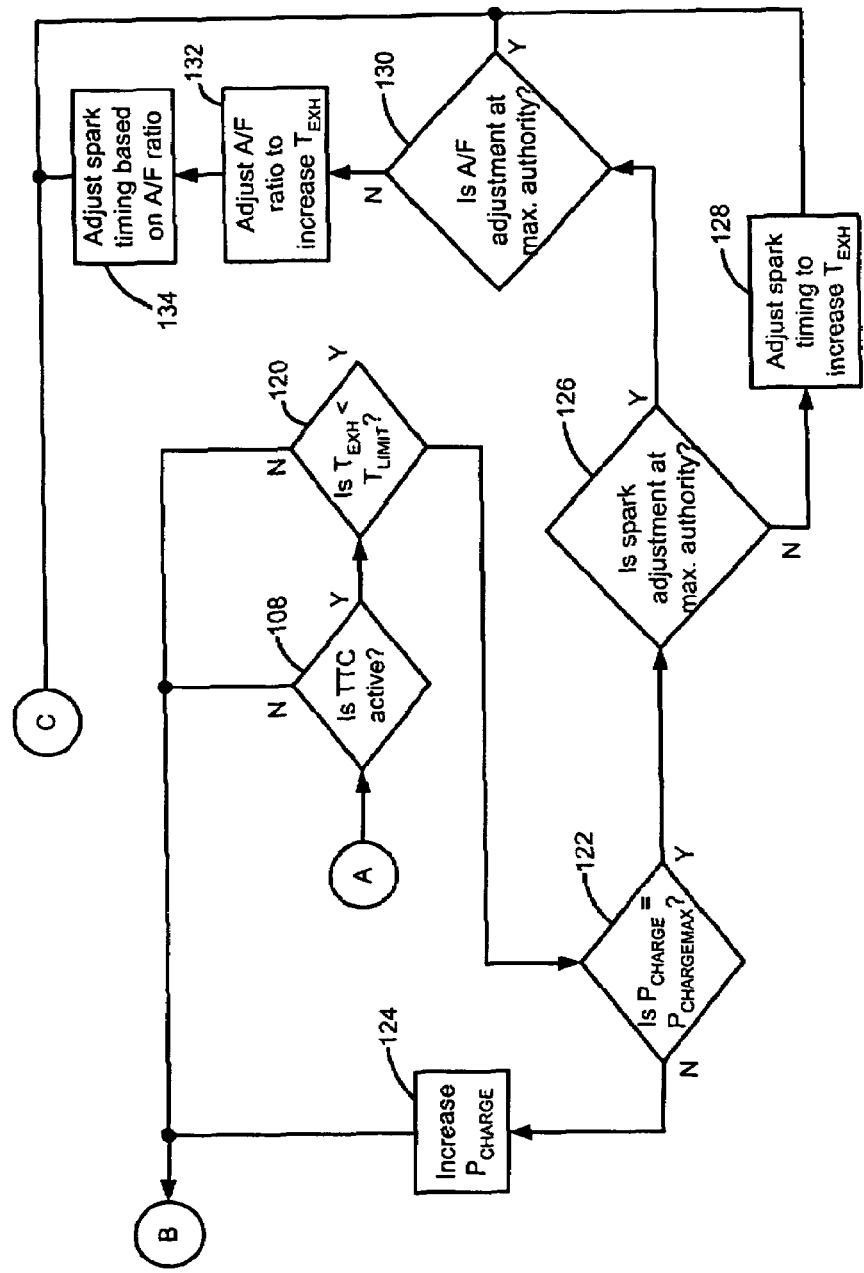
FIG. 2B is a flow chart illustrating further steps performed by the engine control system of the present invention.

Referring now to FIGS. 2A and 2B, exemplary steps executed by the TTC system of the present invention will be described in detail. In step 100, control determines whether the engine 12 is running. If the engine 12 is not running, control ends. If the engine 12 is running, control determines $T_{EXH}$ in step 102. In step 104, control determines whether $T_{EXH}$ is greater than $T_{LIMIT}$. If $T_{EXH}$ is greater than $T_{LIMIT}$, control continues in step 106. If $T_{EXH}$ is not greater than $T_{LIMIT}$, control continues in step 108 in FIG. 2B.

In step 106, control determines whether the A/F adjustment has achieved its maximum authority. If the A/F adjustment has not achieved its maximum authority, control continues in step 110. If the A/F adjustment has achieved its maximum authority, control continues in step 112. In step 110, control adjusts the A/F ratio to reduce $T_{EXH}$. Control adjusts the spark based on the adjusted A/F ratio to maintain stable engine operation in step 114 and loops back to step 102.

In step 112, control determines whether the spark adjustment is at its maximum authority. If the spark adjustment is not at its maximum authority, control continues in step 116. If the spark adjustment is at its maximum authority, control continues in step 118. In step 116, control adjusts the spark timing to reduce $T_{EXH}$ and loops back to step 102. In step 118, control reduces $P_{CHARGE}$ and loops back to step 100.

In step 108, control determines whether TTC is active. If TTC is active, control continues in step 120. If TTC is not active, control loops back to step 100 in FIG. 2A. In step 120, control determines whether $T_{EXH}$ is less than $T_{LIMIT}$. If $T_{EXH}$ is less than $T_{LIMIT}$, control continues in step 120. If $T_{EXH}$ is not less than $T_{LIMIT}$, control loops back to step 100 in FIG. 2A. In step 122, control determines whether $P_{CHARGE}$ is equal to a maximum charge pressure ($P_{CHARGEMAX}$). If $P_{CHARGE}$ is not equal to $P_{CHARGEMAX}$, control increases $P_{CHARGE}$ in step 124 and loops back to step 100 in FIG. 2A. If $P_{CHARGE}$ is equal to $P_{CHARGEMAX}$, control continues in step 126.

In step 126, control determines whether the spark adjustment is at its maximum authority. If the spark adjustment is not at its maximum authority, control continues in step 128. If the spark adjustment is at its maximum authority, control continues in step 130. In step 128, control adjusts the spark timing to increase $T_{EXH}$ and loops back to step 102 in FIG. 2A. In step 130, control determines whether the A/F adjustment has achieved its maximum authority. If the A/F adjustment has not achieved its maximum authority, control continues in step 132. If the A/F adjustment has achieved its maximum authority, control loops back to step 102 in FIG. 2A. In step 132, control adjusts the A/F ratio to increase $T_{EXH}$. Control adjusts the spark based on the adjusted A/F ratio to maintain stable engine operation in step 126 and loops back to step 134 and loops back to step 102 in FIG. 2A.

The turbo temperature control system of the present invention adjusts engine operation based on $T_{EXH}$ to protect the turbo components from extreme temperatures. As described in detail above, the A/F ratio, spark timing and/or $P_{CHARGE}$ can be adjusted to affect $T_{EXH}$. It is appreciated that each of these methods can be used separately or in conjunction with one or more of the other methods to affect $T_{EXH}$. In the case where one ore more of these methods is implemented, it is further appreciated that the order in which the individual methods are executed can vary.

Those skilled in the art can now appreciate from the foregoing description that the broad teachings of the present invention can be implemented in a variety of forms. Therefore, while this invention has been described in connection with particular examples thereof, the true scope of the invention should not be so limited because other modifications will become apparent to the skilled practitioner upon a study of the drawings, specification, and the following claims.

What is claimed is:

1. A method of regulating a temperature of a forced air induction device driven by exhaust gas generated by an engine, comprising:
    determining an exhaust gas temperature;
    comparing said temperature to a threshold temperature;
    adjusting an air-to-fuel ratio of said engine to decrease said temperature when said temperature exceeds said threshold temperature;
    adjusting a spark timing of said engine to decrease said temperature when said air-to-fuel ratio has been adjusted to a maximum limit and said temperature exceeds said threshold temperature; and
    reducing a charge pressure generated by said forced air induction device to decrease said temperature when said spark timing has been adjusted to a maximum limit and said temperature exceeds said threshold temperature.

2. The method of claim 1 further comprising setting said threshold temperature equal to a safe operating temperature of said forced air induction device.

3. The method of claim 1 further comprising regulating operation of said engine to increase said temperature when said temperature is below said threshold temperature.

4. The method of claim 3 further comprising adjusting said air-to-fuel ratio to increase said temperature.

5. The method of claim 3 further comprising adjusting said spark timing to increase said temperature.

6. A method of regulating a temperature of a forced air induction device driven by exhaust gas generated by an engine, comprising:
    determining an exhaust gas temperature;
    comparing said temperature to a threshold temperature;
    adjusting an air-to-fuel ratio of said engine to decrease said temperature when said temperature exceeds said threshold temperature;
adjusting a spark timing of said engine to decrease said temperature when said air-to-fuel ratio has been adjusted to a maximum limit and said temperature exceeds said threshold temperature;
    regulating operation of said engine to increase said temperature when said temperature is below said threshold temperature; and
    adjusting said charge pressure to increase said temperature when said temperature is below said threshold temperature.

7. Turbine temperature control system for regulating operation of an engine and a forced air induction device, comprising:
    a sensor that is responsive to an exhaust gas temperature and that generates a signal; and
    a control module that determines a temperature based on said signal, that compares said temperature to a threshold temperature, that adjusts an air-to-fuel ratio of said engine to decrease said temperature when said temperature exceeds said threshold temperature, that adjusts a spark timing of said engine to decrease said temperature when said air-to-fuel ratio has been adjusted to a maximum limit and said temperature exceeds said threshold temperature, and that reduces a charge pressure generated by said forced air induction device to decrease said temperature when said spark timing has been adjusted to a maximum limit and said temperature exceeds said threshold temperature.

8. The system of claim 7 wherein said threshold temperature is determined based on a safe operating temperature of said forced air induction device.

9. The system of claim 7 herein said control module operates a bypass valve of said forced air induction device to reduce said charge pressure when said temperature exceeds said threshold temperature.

10. The system of claim 7 wherein said control module regulates operation of said engine to increase said temperature when said temperature is below said threshold temperature.

11. The system of claim 10 wherein said control module operates a bypass valve of said forced air induction device to increase a charge pressure when said temperature is below said threshold temperature.

* * * * *